H. H. KENNEDY.
MOTOR CAR.
APPLICATION FILED JUNE 19, 1911.
1,034,464.
Patented Aug. 6, 1912.
2 SHEETS—SHEET 1.
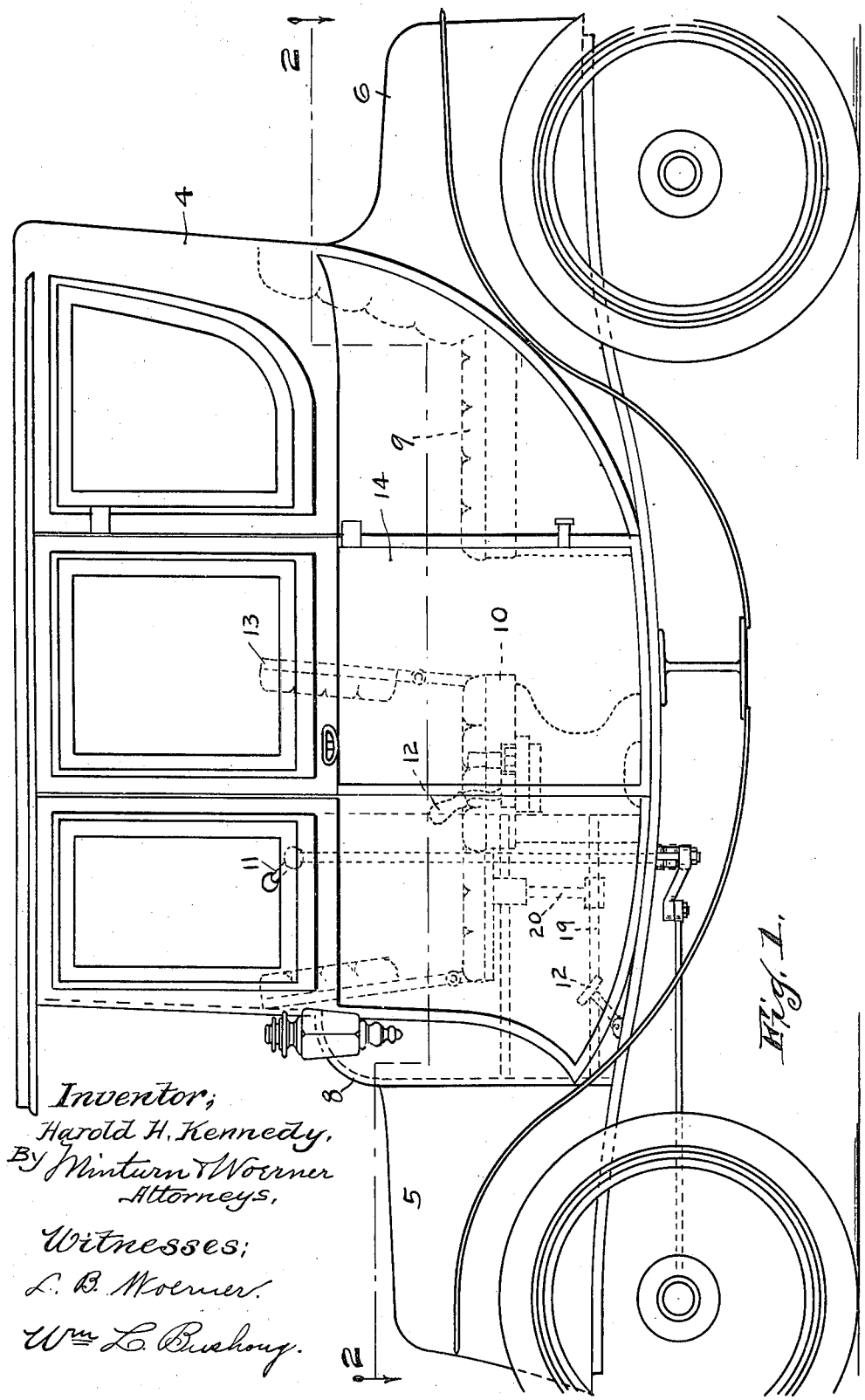

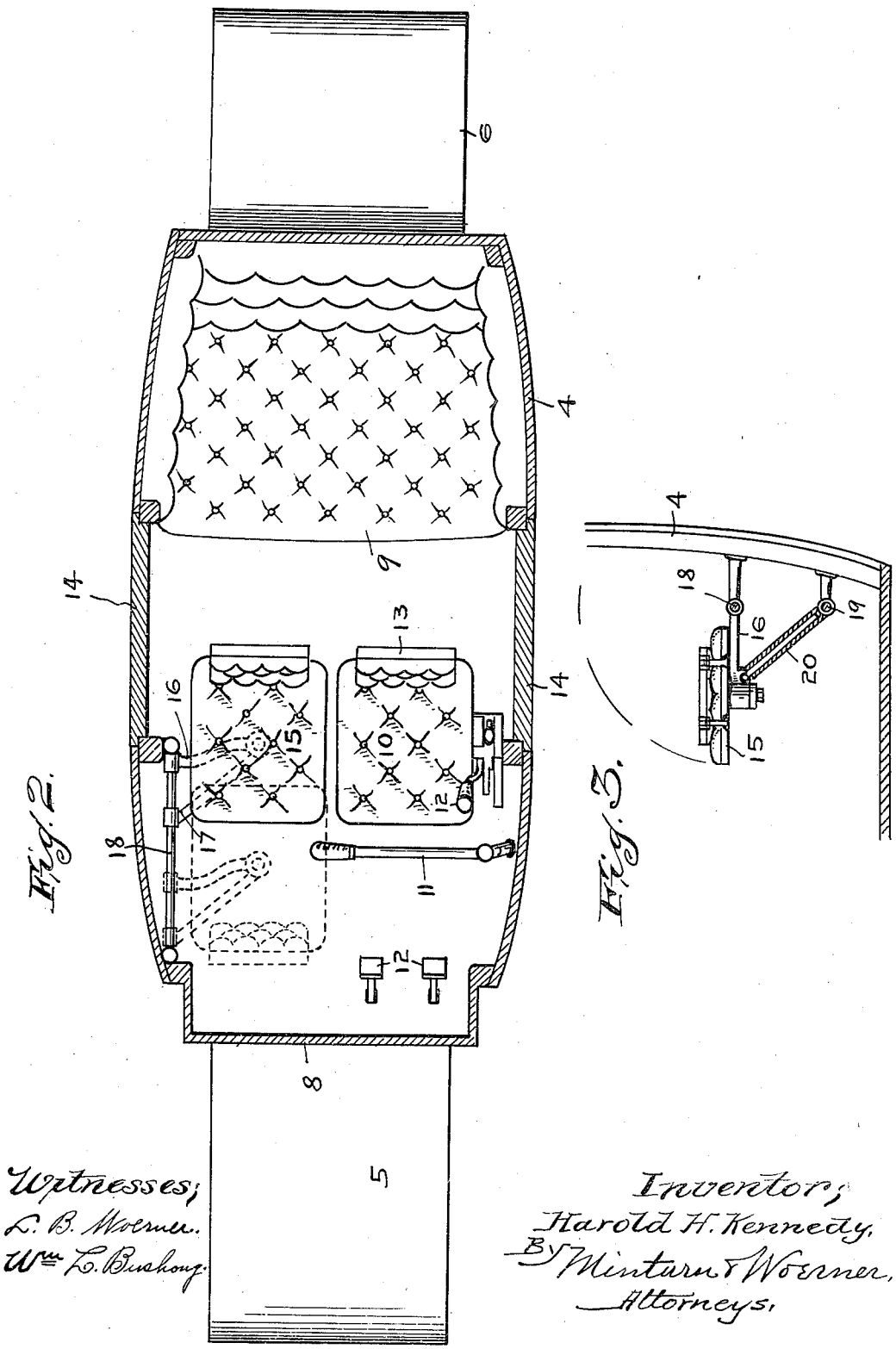

UNITED STATES PATENT OFFICE.

HAROLD H. KENNEDY, OF INDIANAPOLIS, INDIANA, ASSIGNOR TO THE WAVERLEY COMPANY, OF INDIANAPOLIS, INDIANA, A CORPORATION OF INDIANA.

MOTOR-CAR 1,034,464.            Specification of Letters Patent.        Patented Aug. 6, 1912.

Application filed June 19, 1911. Serial No. 634,101.

*To all whom it may concern:*

Be it known that I, HAROLD H. KENNEDY, a citizen of the United States, residing at Indianapolis, in the county of Marion and State of Indiana, have invented certain new and useful Improvements in Motor-Cars, of which the following is a specification.

This invention relates to motor cars having closed bodies and is illustrated as applied to an electric car but it may be used to advantage in machines driven by gas engines.

The object is to provide a closed vehicle having a single passenger compartment with seats in two rows whereon the passengers may all face in the direction of travel of the car without being cramped for leg room, and in which the driver will sit facing the front on the front seat instead of sitting on the rear seat where his view ahead is obstructed by the passengers on the seat in front of him.

The object also is to provide a two-part front seat in which one of the parts is adjustable in position or distance from the front of the body and adjustable in the direction in which it faces, and which is also capable of movement out of the way of a person desiring to reach the driver's seat.

Another object is to obtain the necessary leg room, and space within the car for the front passengers without destroying the symmetry and proportion of the car-body in its outward appearance.

I accomplish the above objects of the invention by the mechanism illustrated in the accompanying drawings, in which—

Figure 1 is a side elevation of a car embodying my improvements, the seats being shown in dotted lines. Fig. 2 is a horizontal section on the line 2—2 of Fig. 1, and Fig. 3 is a detail in vertical cross section of the body showing the seat in rear end view with the back folded preparatory to folding the seat up against the body in the direction of the dotted lines, the diagonal brace being sectioned.

Like characters of reference indicate like parts throughout the several views of the drawings.

The main body 4 is supported between and by the front battery-box 5, and rear motor and battery-box 6, whereby the weight of motor and batteries will be supported as near directly over the front and rear axles as possible. The batteries and motor may all be in one box, either front or rear, and the motor may be in either front or rear box, without departing from the spirit of my invention.

Between the body 4 and front box 5 is a hollow extension 8 higher and wider than the box but not as high or wide as the body 4 which serves the purpose of increasing the inside length of the body in front to allow ample room for the feet and legs of the occupants of the front seats.

The width of body 4 is greater than that of parts 5, 6 and 8, and the profile will be in graceful design as shown, which by reason of the offset of the body from parts 5, 6 and 8, will stand out as the distinctive and salient feature of the car and will greatly facilitate the designing of fine vehicles.

Extending across the rear of body 4 is a seat 9, and located in advance of seat 9 is a driver's seat 10 with the usual steering lever 11 and motor control foot-and hand levers 12, placed conveniently around it. The seat 9 will be stationary but its back 13 will be hinged to permit folding out of the way when passengers are entering or leaving the car. Doors 14, one on each side of the car between the front and rear seats, afford entrance from either side.

A seat 15 is swivelly mounted on an arm 16 which has a brace 17. The arm and brace terminate with sleeves which slide on a horizontal bar 18 supported from the body 4. A lower bar 19, parallel with bar 18, supports a sleeve on the lower end of a diagonal brace 20, the upper end of which is hinged to arm 16 under the seat. The brace 20 is in two telescoping parts to permit elongation when the seat is folded up against the body 4 in the direction shown by the dotted lines of Fig. 3, to allow the driver to reach his seat. The seat 15 may be adjusted to the position shown in dotted lines in Fig. 2 and turned on its swivel so the back will be toward the front when that occupant desires to face the occupant of the rear seat.

All of the seats of the vehicle are located within the single compartment of its closed body.

Having thus fully described my inven- tion, what I claim as new and wish to secure by Letters Patent, is—

1. A main motor-car body having a compartment with seats for passengers, a front and rear box adapted to support the body and to receive a motor and batteries, and an extension between the main body and front box opening into the body of greater width and height than the box and of less width and height than the body.

2. A main motor-car body having a compartment for passengers, a rear transverse passenger seat in said compartment, additional seats also in said compartment in front of said rear seat facing toward the front of the vehicle, a box in front of said main body adapted to receive batteries, a box at the rear of the body adapted to receive a motor and batteries, said boxes being adapted to support the body, and an extension between said body and the front box of less height and width than the body to afford additional leg room for the occupants of the front seats.

3. A main motor-car body having a passenger compartment, a rear transverse passenger seat in said single compartment, two additional seats in front of said rear seat in said compartment, one of the latter being stationary and adapted to be occupied by the driver of the machine, a box in front of said main body adapted to receive batteries, a box at the rear of the body adapted to receive a motor and batteries, said boxes being adapted to support the body, and an extension between said body and the front box of less height than the body to afford additional leg room for the occupants of the front seats.

In witness whereof, I, have hereunto set my hand and seal at Indianapolis, Indiana, this 3rd day of June, A. D. one thousand nine hundred and eleven.

HAROLD H. KENNEDY. [L. S.]

Witnesses:
J. A. MINTURN,
F. W. WOERNER.